(12) United States Patent
Hoffman et al.

(10) Patent No.: US 7,631,656 B2
(45) Date of Patent: Dec. 15, 2009

(54) PRESSURE CONTROL VALVE

(75) Inventors: Fred Hoffman, Columbia Station, OH (US); Leonard Quinn, Lagrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 554 days.

(21) Appl. No.: 11/280,901

(22) Filed: Nov. 16, 2005

(65) Prior Publication Data

US 2007/0107784 A1 May 17, 2007

(51) Int. Cl.
*F16K 15/00* (2006.01)
(52) U.S. Cl. .................. 137/538; 137/514.5; 137/454.2
(58) Field of Classification Search .............. 137/115.2, 137/269.5, 375, 495, 498, 505.13, 512.2, 137/514, 516.27, 529, 538, 539.5, 588, 540, 137/542, 516.25, 454.2, 514.5; 303/29, 40, 303/64, 7
See application file for complete search history.

(56) References Cited

U.S. PATENT DOCUMENTS

| | | | | |
|---|---|---|---|---|
| 154,177 | A | * | 8/1874 | Flanders et. al. ......... 137/514.5 |
| 620,936 | A | * | 3/1899 | Kunzer et.al. .............. 137/541 |
| 965,052 | A | * | 7/1910 | Wainwright et. al. ..... 137/514.7 |
| 2,462,614 | A | * | 2/1949 | De Witt ....................... 137/204 |
| 2,781,775 | A | * | 2/1957 | Merrill ....................... 137/498 |
| 3,749,122 | A | * | 7/1973 | Gold ........................ 137/515.7 |
| 4,682,531 | A | * | 7/1987 | Mayer .......................... 91/446 |
| 5,236,250 | A | * | 8/1993 | Moody et al. .................. 303/7 |
| 5,425,397 | A | * | 6/1995 | Mackal ....................... 137/540 |
| 5,917,139 | A | | 6/1999 | Goodell et al. |
| 6,074,462 | A | | 6/2000 | Quinn et al. |
| 6,247,764 | B1 | | 6/2001 | Koelzer |
| 6,585,806 | B2 | | 7/2003 | Quinn et al. |
| 6,858,066 | B2 | | 2/2005 | Quinn et al. |
| 2004/0007261 | A1 | * | 1/2004 | Cornwell ................ 137/115.16 |
| 2005/0092958 | A1 | * | 5/2005 | Flynn ......................... 251/323 |

OTHER PUBLICATIONS

"Spin-On" Cartridge, Air Dryers From Bendix, Bendix AD-IS, Bendix, Knorr-Bremse Group, Feb. 2002.
Four-Circuit Protection Valve, Descriptive Catalog Sheet, AE4000-K19 EN, Knorr-Bremse Group, Feb. 1982.
Single Circuit Protection Valve, Technical Pamphlet 9/011, Bendix/Allied Signal , Apr. 1976.

* cited by examiner

*Primary Examiner*—John Rivell
*Assistant Examiner*—Macade Brown
(74) *Attorney, Agent, or Firm*—Calfee, Halter & Griswold LLP

(57) ABSTRACT

A pressure control valve includes a housing, a piston within the housing, a biasing means within the housing for biasing the piston to seat in a first position for limiting fluid communication between an inlet port of the housing and an outlet port of the housing, and an insert cooperating with the biasing means for setting a pressure differential between an inlet side of the piston and an outlet side of the piston that unseats the piston from the first position for establishing fluid communication between the inlet port and the outlet port.

13 Claims, 5 Drawing Sheets

PRESSURE CONTROL VALVE

BACKGROUND

The present invention relates to pressure protection valves. It finds particular application in conjunction with pressure control valves used with an air dryer system and will be described with particular reference thereto. It will be appreciated, however, that the invention is also amenable to other applications.

Air dryer systems use multiple pressure control valves, which are also referred to as pressure protection valves, to distribute air to primary, secondary, and auxiliary circuits of an air braked vehicle. The current design of pressure protection valves make it is very difficult, if not impossible, to service the pressure protection valves in the field. Therefore, in some instances, rather than merely servicing/replacing a defective pressure protection valve in a device (e.g., an air dryer) that is otherwise operating properly, the entire device must be replaced.

Furthermore, in situations where it is possible to merely replace a defective pressure protection valve in a device that is otherwise operating properly, issues arise with regard to the settings of the replacement pressure protection valve. More specifically, a person replacing the pressure protection valve may intentionally or unintentionally adjust an opening pressure setting that would cause the replacement pressure protection valve to function differently than the original pressure protection valve.

Also, current devices incorporating pressure protection valves are made from a material (e.g., an aluminum extrusion) that provides an adequate surface finish required for proper operation of the pressure protection valves. The materials typically used for providing such a surface finish are relatively expensive.

The present invention provides a new and improved apparatus and method which addresses the above-referenced problems.

SUMMARY

In one aspect of the present invention, it is contemplated to provide a valve that is easier to service/replace in a device (e.g., an air dryer) when the valve becomes defective.

In one embodiment, a pressure control valve includes a housing, a piston within the housing, a biasing means within the housing for biasing the piston to seat in a first position for limiting fluid communication between an inlet port of the housing and an outlet port of the housing, and an insert cooperating with the biasing means for setting a pressure differential between an inlet side of the piston and an outlet side of the piston that unseats the piston from the first position for establishing fluid communication between the inlet port and the outlet port.

In another embodiment, a pressure control valve includes a housing, a sleeve removably secured at least partially within the housing, a piston within the sleeve, and a spring within the sleeve for biasing the piston to seat in a first position for limiting fluid communication between an inlet port of the housing and an outlet port of the housing. An insert cooperates with the spring for setting a pressure differential between an inlet side of the piston and an outlet side of the piston that unseats the piston from the first position for establishing fluid communication between the inlet port and the outlet port.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
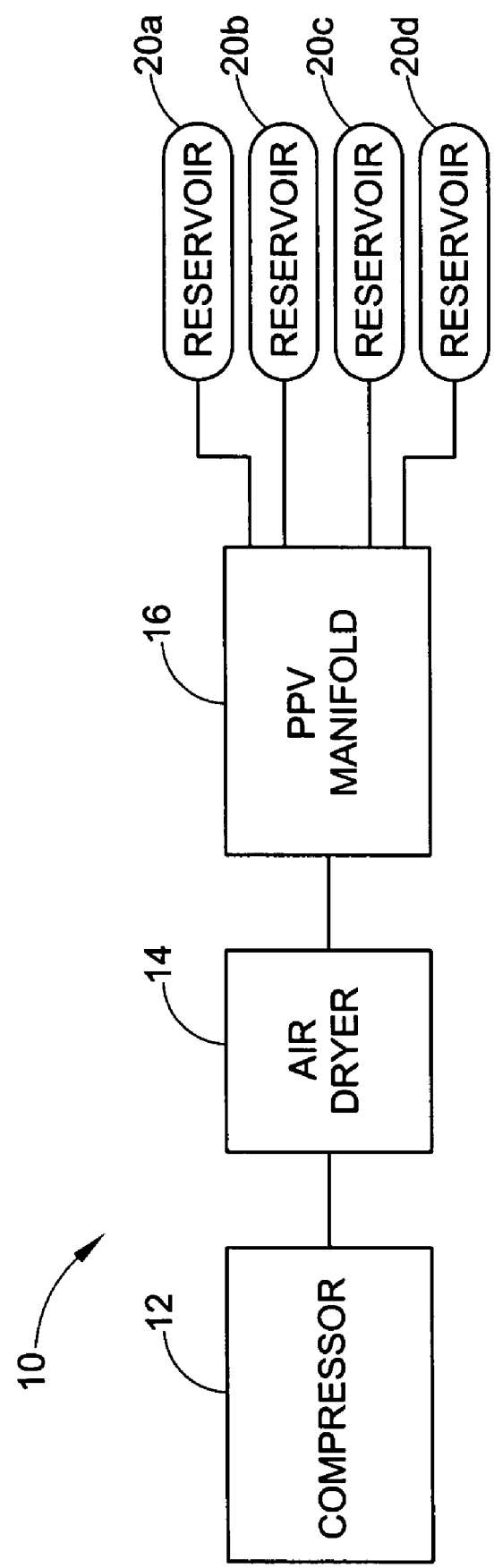
FIG. 1 illustrates an air system in accordance with one embodiment of the present invention.

With reference to FIG. 1, an air system 10 is illustrated in accordance with one embodiment of an apparatus illustrating an aspect of the present invention. The air system 10 includes an air compressor 12 that fluidly communicates with an air dryer 14 which, in turn, fluidly communicates with a pressure control valve manifold 16. The compressor 12 supplies compressed air to the air dryer 14, which dries the compressed air. The dried compressed air is transmitted from the air dryer 14 to the manifold 16. The manifold 16 fluidly communicates with at least one reservoir 20*a*, 20*b*, 20*c*, 20*d* that supplies dried compressed air to respective auxiliary systems on a vehicle.

Figure 2:
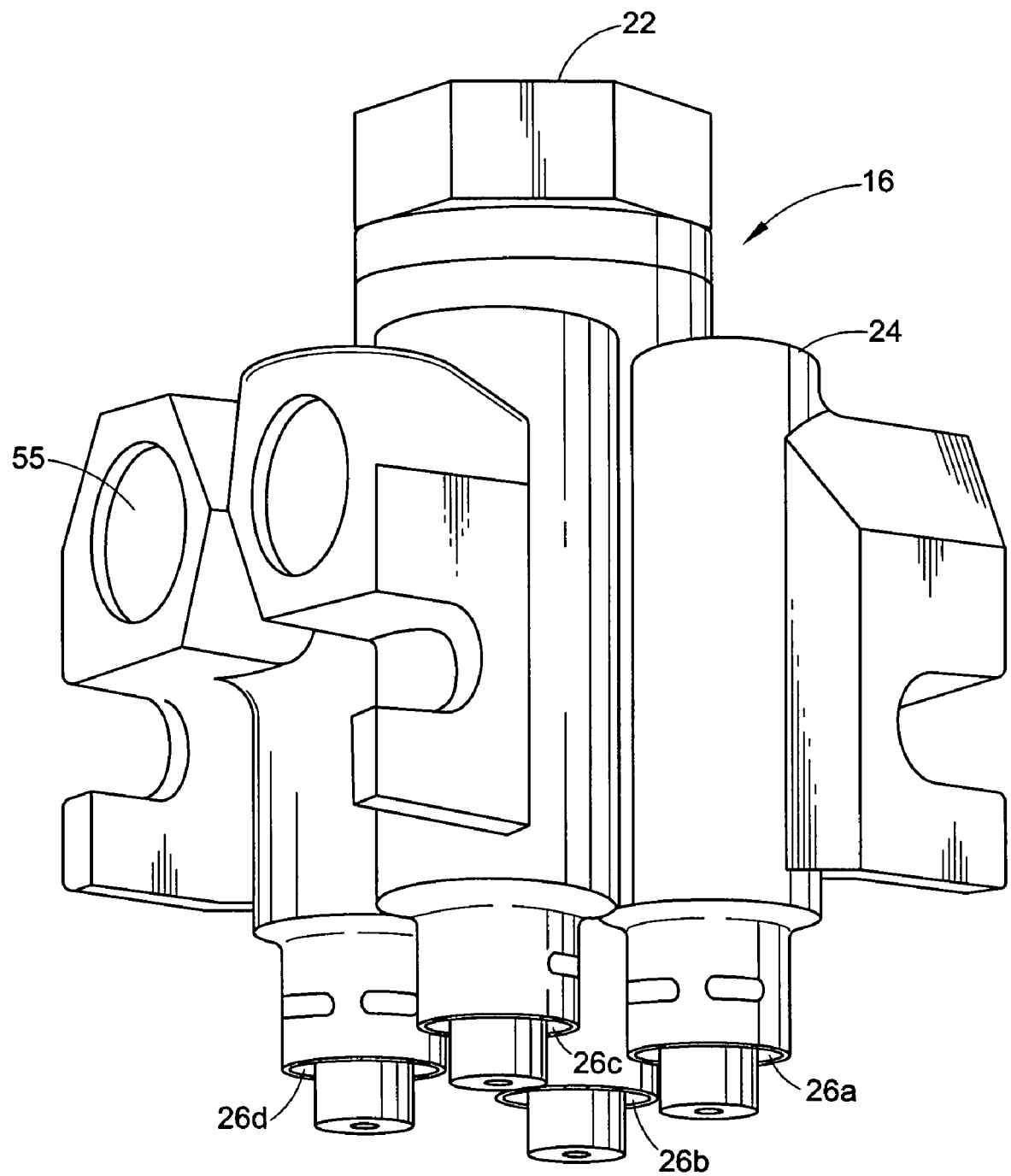
FIG. 2 illustrates a pressure control valve manifold in accordance with one embodiment of the present invention.

With reference to FIG. 2, the pressure control valve manifold 16 is illustrated in accordance with one embodiment of an apparatus illustrating an aspect of the present invention. In this embodiment, the manifold 16 includes an inlet port 22, a housing 24, and a plurality (e.g., four) of pressure control valves 26*a*, 26*b*, 26*c*, 26*d* (e.g., pressure protection valves).

Figure 3:
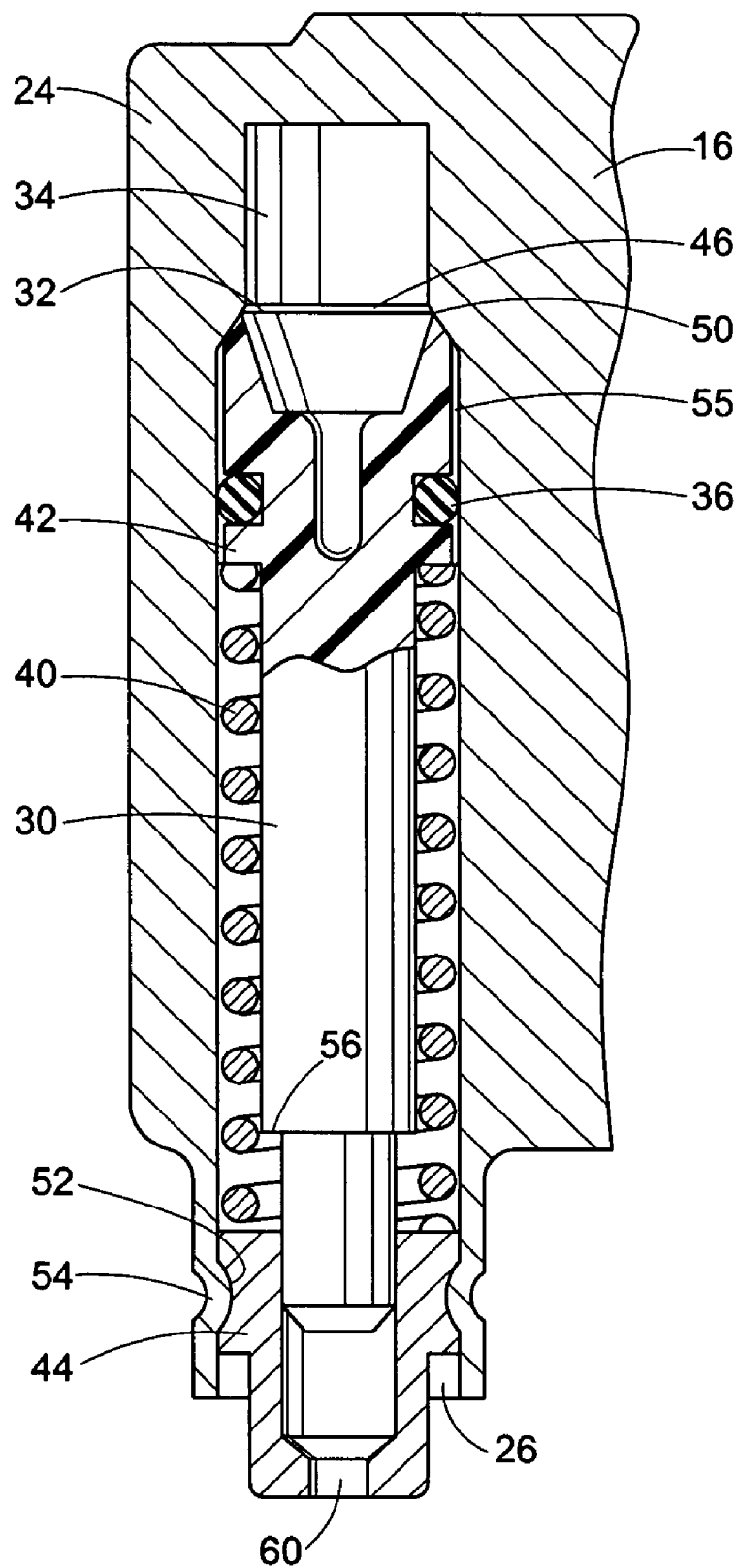
FIG. 3 illustrates a cross-sectional view of one part of the manifold illustrated in FIG. 2 in accordance with one embodiment of the present invention.

With reference to FIGS. 2 and 3, each of the pressure control valves 26*a*, 26*b*, 26*c*, 26*d* (see FIG. 2) in the pressure control valve manifold 16 is illustrated as the pressure control valve 26 (see FIG. 3) in accordance with one embodiment of an apparatus illustrating an aspect of the present invention.

In this embodiment, the pressure control valve 26 is defined by the housing 24 of the manifold 16. A piston 30 is inserted into the manifold housing 24. An inlet sealing means 32 of the piston is seated in an inlet port 34 of the housing 24. It is contemplated that the manifold housing 24 is die cast aluminum or zinc. Furthermore, it is contemplated that the piston 30 is a plastic material. However, other materials are also contemplated for the manifold housing and the piston. An adequate seal is provided between the die cast zinc housing 24 and the plastic piston 30.

In the illustrated embodiment, a second sealing means 36 is also inserted into the manifold housing 24. In one embodiment, the second sealing means 36 is part of an assembly including the piston 30 and the inlet sealing means 32. However, other embodiments are also contemplated. The second sealing means 36 provides a seal between the piston 30 and the manifold housing 24.

A biasing means 40 (e.g., a spring) is inserted within the housing 24. A first end of the spring 40 cooperates with a shoulder 42 of the piston 30. An insert 44 is positioned at least partially within the manifold housing 24 and cooperates with a second end of the piston 30. An opening (operating) pressure represents a pressure differential between an inlet side 46 of the inlet sealing means 32 of the piston 30 and an outlet side or port 55 of the inlet sealing means 32 of the piston 30. The insert 44 is positioned within the manifold housing 24 at a position for achieving a predetermined opening pressure of the inlet sealing means 32 of the piston 30.

A deformed portion 52 (e.g., detent or indent) of the insert 44 cooperates with a deformed portion 54 of the manifold housing 24 to permanently secure the insert 44 within the manifold housing 24 at a position to maintain the predetermined opening pressure.

During use, the spring 40 biases the inlet sealing means 32 to seal the inlet port 34 of the housing 24 at a point 50. Therefore, inlet side 46 of the piston 30 is in fluid communication with the inlet port 34. In this position, fluid communication between the inlet port 34 and the outlet port 55 is controlled (e.g., significantly limited). Once the pressure at the inlet side 46 of the piston 30 is greater than the pressure at the outlet port 55 of the piston 30 by at least the opening pressure, the inlet sealing means 32 of the piston 30 is unseated from the inlet port 34 of the housing 24. A second shoulder 56 of the piston 30 acts as a stop for the piston 30 within the housing 24 when the pressure differential between the inlet side 46 and the outlet port 55 reaches a second predetermined level. More specifically, the second shoulder 56 abuts with the insert 44 to define a position where the piston 30 is fully extended within the housing 24.

Once the piston 30 is unseated from the inlet port 34, the inlet port 34 is in fluid communication with the outlet port 55 so that air may pass freely between the inlet port 34 and the outlet port 55. The second sealing means 36 controls (e.g., reduces) air passing between the inlet and outlet ports 34, 55 from escaping via an insert passage 60 in the insert 44. Air freely passes in and out of the portion of the housing 24 in which the spring 40 is mounted through the insert passage 60 as the piston 30 moves within the housing 24.

Figure 4:
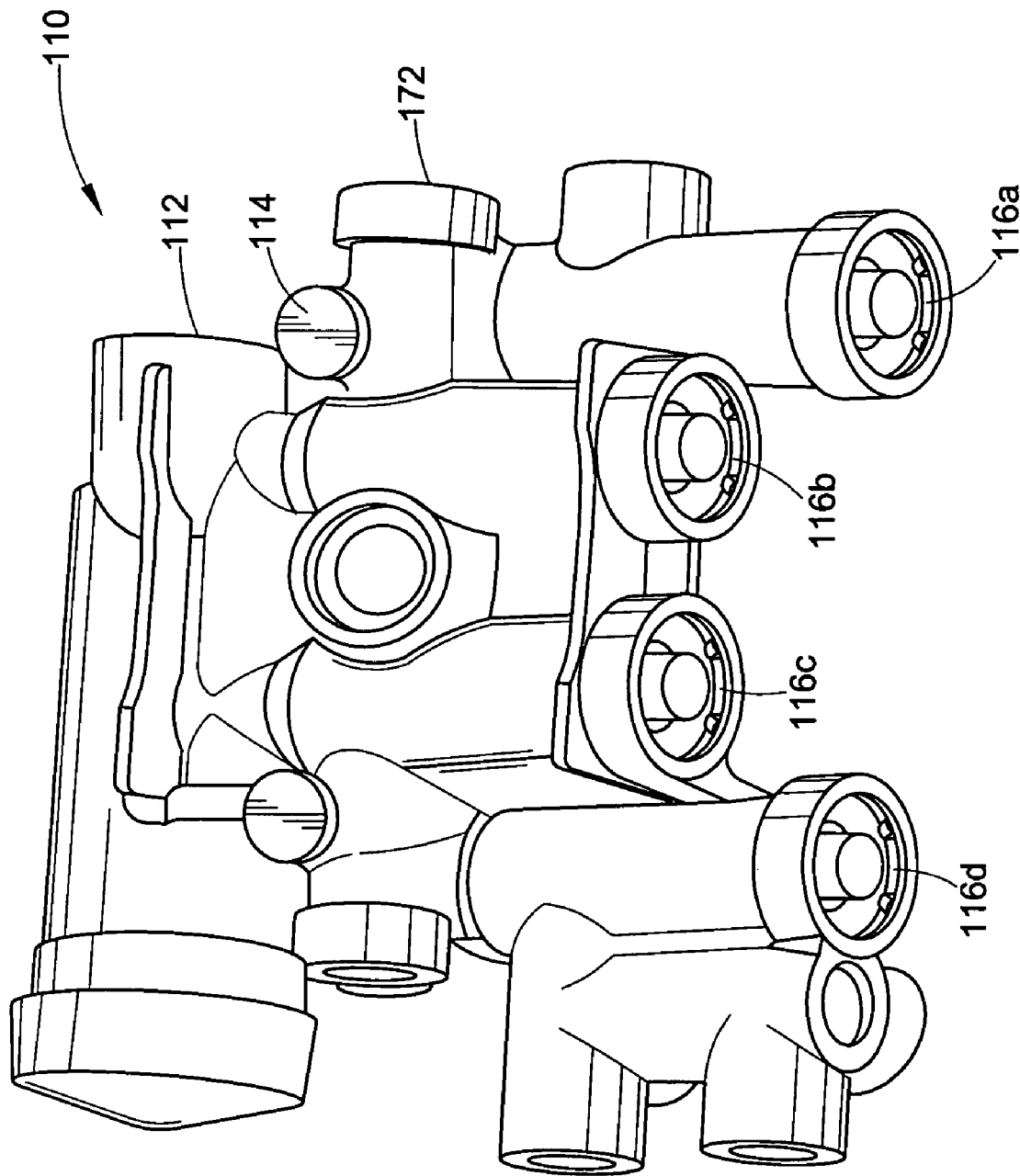
FIG. 4 illustrates a pressure control valve manifold in accordance with another embodiment of the present invention.

With reference to FIG. 4, a pressure control valve manifold 110 is illustrated in accordance with another embodiment of an apparatus illustrating an aspect of the present invention.

The pressure control valve manifold 110 includes an inlet port 112, a housing 114, and a plurality (e.g., four) of pressure control valves 116a, 116b, 116c, 116d (e.g., pressure protection valves).

Figure 5:
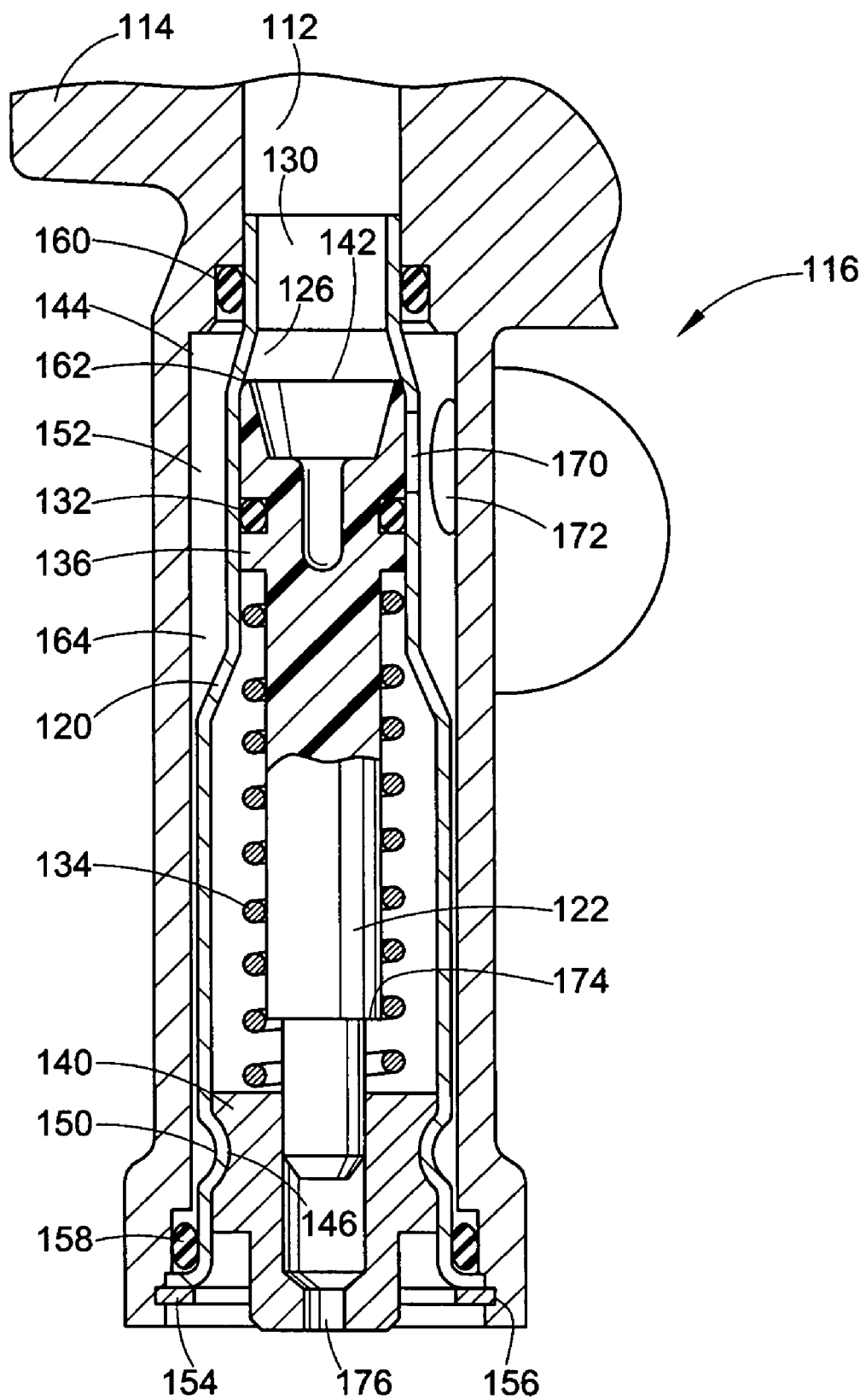
FIG. 5 illustrates a cross-sectional view of one part of the manifold illustrated in FIG. 4 in accordance with one embodiment of the present invention.

With reference to FIGS. 4 and 5, each of the pressure control valves 116a, 116b, 116c, 116d (see FIG. 4) in the pressure control valve manifold 110 is illustrated as the pressure control valve 116 (see FIG. 5) in accordance with one embodiment of an apparatus illustrating an aspect of the present invention.

In this embodiment, the pressure control valve 116 is defined by a sleeve 120 within the housing 114 of the manifold 110. A piston 122 is inserted into the sleeve 120. An inlet sealing means 162 of the piston 122 is seated in a sleeve inlet port 126, which fluidly communicates with an inlet port 130 of the housing 114. As in the previous embodiment, it is contemplated that the manifold housing 114 is die cast aluminum or zinc. Furthermore, it is contemplated that the piston 122 is a plastic material. However, other materials are also contemplated for the manifold housing 114 and the piston 122. In addition, it is contemplated that the sleeve 120 is a brass or aluminum material.

In the illustrated embodiment, a second sealing means 132 is also inserted into the sleeve 120. In one embodiment, the second sealing means 132 is part of an assembly including the piston 122 and the inlet sealing means 162. However, other embodiments are also contemplated. The second sealing means 132 provides a seal between the piston 122 and the sleeve 120.

A biasing means 134 (e.g., a spring) is inserted within the sleeve 120. A first end of the spring 134 cooperates with a shoulder 136 of the piston 122. An insert 140 is positioned at least partially within the sleeve 120 and cooperates with a second end of the piston 122. As discussed above, the opening pressure represents a pressure differential between an inlet side 142 of the inlet sealing means 162 of the piston 122 and an outlet side 144 of the inlet sealing means 162 of the piston 122. The insert 140 is positioned within the sleeve 120 at a position for achieving a predetermined opening pressure of the inlet sealing means 162 of the piston 122.

A deformed portion 146 (e.g., detent or indent) of the insert 140 cooperates with a deformed portion 150 of the sleeve 120 to permanently secure the insert 140 within the sleeve 120 at a position to maintain the predetermined opening pressure.

The sleeve 120 is removably inserted into a cavity 152 of the manifold housing 114. A retainer 154 removably secures the sleeve 120 within a groove 156 of the housing 114. In the illustrated embodiment, the sleeve 120 is inserted completely within the cavity 152. However, other embodiments in which the sleeve 120 is secured to the manifold housing 114 (e.g., the sleeve is only partially inserted within the cavity) are also contemplated. Furthermore, sealing means 158, 160 are interposed between the sleeve 120 and the manifold housing 114.

During use, the spring 134 biases the inlet sealing means 162 to seal the inlet port 112 of the housing 114 at the inlet sealing means 162. The sealing means 158, 160 control (e.g., reduce and/or limit) pressurized air from escaping the manifold housing 114 via a volume 164 between the housing 114 and the sleeve 120. Therefore, inlet side 142 of the piston 122 is in fluid communication with the sleeve inlet port 126 and the housing inlet port 112, and the outlet side 144 of the piston 122 is in fluid communication with a sleeve outlet port 170 and a housing outlet port 172. Once the pressure at the inlet side 142 of the piston 122 is greater than the pressure at the outlet side 144 of the piston 122 by at least the opening pressure, the inlet sealing means 162 of the piston 122 is unseated from the sleeve inlet port 126. A second shoulder 174 of the piston 122 acts as a stop for the piston 122 within the sleeve 120 when the pressure differential between the inlet and outlet sides 142, 144, respectively, of the inlet sealing means 162 reaches a second predetermined level. More specifically, the second shoulder 174 abuts with the insert 140 to define a position where the piston 122 is fully extended within the sleeve 120.

Once the piston 122 is unseated from the sleeve inlet port 126, the housing inlet port 112 is in fluid communication with both the sleeve outlet port 170 and the housing outlet port 172 so that air may pass freely between the housing inlet port 112 and the housing outlet port 172. The second sealing means 132 controls (e.g., reduces or prevents) the air passing between the housing inlet and housing outlet ports 112, 172 from escaping via an insert passage 176 in the insert 140. Air freely passes in and out of the cavity 152 through the insert passage 176 as the piston 122 moves within the cavity 152.

If the sleeve 120 becomes defective or must be replaced for any reason, the retainer 154 is removed. Once the retainer 154 is removed, the sleeve 120, which includes the piston 122, inlet sealing means 162, the spring 134, the second sealing means 132, and the insert 140, may also be removed from the cavity 152. Another sleeve, which includes a piston, an inlet sealing means, spring, second sealing means, and insert, may then be inserted into the cavity 152. Because the pressure control valve 116 is defined by the sleeve 120, it is to be understood that sleeve 120 (i.e., the pressure control valve 116) may be assembled at a location remote from the manifold housing 114. Furthermore, because the opening pressure is determined as a function of the spring 134 and the insert 140, which are included within the sleeve 120, greater uniformity among different pressure control valves 116 may be achieved.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A pressure control valve manifold, comprising:
   a manifold housing;
   a manifold inlet port in the manifold housing for receiving pressurized air;
   a plurality of pressure control valves in the manifold housing, each of the pressure control valves comprising:
      a pressure control valve inlet port receiving the pressurized air from the manifold inlet port;
      a pressure control valve housing;
      a piston within the pressure control valve housing;
      a spring within the pressure control valve housing for biasing the piston to seat in a first position for limiting fluid communication between the pressure control valve inlet port and a pressure control valve outlet port of the pressure control valve housing; and
      an insert at least partially surrounding a portion of the piston and cooperating with the spring for setting a pressure differential between an inlet side of the piston and an outlet side of the piston that unseats the piston from the first position for establishing fluid communication between the pressure control valve inlet port and the pressure control valve outlet port, the insert being secured at a predetermined position within the housing for non-adjustably setting the pressure differential, the insert including an insert passage to atmosphere, and a shoulder of the piston abutting the insert when a pressure at the inlet side of the piston is above a predetermined level and
   a plurality of manifold outlet ports for delivering the pressurized air from the respective pressure control valve outlet ports.

2. The pressure control valve manifold as set forth in claim 1, further comprising: a sleeve at least partially within the pressure control valve housing, the insert being secured at least partially within the sleeve.

3. The pressure control valve manifold as set forth in claim 2, further including: means for securing the insert in the sleeve.

4. The pressure control valve manifold as set forth in claim 3, wherein the means for securing includes:
   a detent in the sleeve;
   a detent in the insert, the detent of the sleeve cooperating with the detent of the insert for securing the insert at the predetermined position within the sleeve.

5. The pressure control valve manifold as set forth in claim 4, wherein: the pressure differential is set as a function of a position of the insert in the sleeve.

6. The pressure control valve manifold as set forth in claim 2, further including: a retainer securing the sleeve in the pressure control valve housing.

7. The pressure control valve as set forth in claim 1, further including: means for securing the insert at least partially within the pressure control valve housing.

8. The pressure control valve manifold as set forth in claim 7, wherein the means for securing includes:
   a crimped portion in the pressure control valve housing;
   a crimped portion in the insert, the crimped portion of the pressure control valve housing cooperating with the crimped portion of the insert for securing the insert at the predetermined position within the pressure control valve housing.

9. The pressure control valve manifold as set forth in claim 1, further including: sealing means within the pressure control valve housing, a pressure differential above a predetermined level sealingly seating the piston in a second position within the housing, the pressure control valve inlet port fluidly communicating with the pressure control valve outlet port when the piston is in the second position, and the sealing means limiting fluid communication between the insert passage of the insert and both the pressure control valve inlet port and the pressure control valve outlet port when the piston is in the second position.

10. A pressure control valve, including:
   a housing;
   a sleeve removably secured at least partially within the housing;
   a piston within the sleeve;
   a spring within the sleeve for biasing the piston to seat in a first position for limiting fluid communication between an inlet port of the housing and an outlet port of the housing; and
   an insert at least partially surrounding a portion of the piston and cooperating with the spring for setting a pressure differential between an inlet side of the piston and an outlet side of the piston that unseats the piston from the first position for establishing fluid communication between the inlet port and the outlet port, the pressure differential determined as a function of a position of the insert relative to the sleeve, the insert being secured at a predetermined position within the housing for non-adjustably setting the pressure differential, the insert including an insert passage to atmosphere, and a shoulder of the piston abutting the insert when a pressure at the inlet side of the piston is above a predetermined level.

11. The pressure control valve as set forth in claim 10, wherein: the insert is secured at least partially within the sleeve.

12. The pressure control valve as set forth in claim 10, further including: a removable retainer for removably securing at least a portion of the sleeve in the housing.

13. The pressure control valve as set forth in claim 10, wherein a second pressure differential between the inlet and outlet sides of the piston seats the piston in a second position for establishing the fluid communication between the inlet and outlet ports, for limiting fluid communication between the insert passage and the inlet port, and for limiting fluid communication between the insert passage and the outlet port.

* * * * *

UNITED STATES PATENT AND TRADEMARK OFFICE
CERTIFICATE OF CORRECTION

PATENT NO. : 7,631,656 B2  Page 1 of 1
APPLICATION NO. : 11/280901
DATED : December 15, 2009
INVENTOR(S) : Hoffman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 940 days.

Signed and Sealed this

Second Day of November, 2010

David J. Kappos
*Director of the United States Patent and Trademark Office*